United States Patent
Yeh et al.

(10) Patent No.: US 8,587,536 B2
(45) Date of Patent: Nov. 19, 2013

(54) MICRO-ELECTRODE MATRIX AND A TOUCH PANEL WITH A MICRO-ELECTRODE MATRIX

(75) Inventors: Herng-Ming Yeh, Taoyuan County (TW); Yi-Ta Chen, Hsinchu (TW)

(73) Assignee: Higgstec Inc., Taoyuan Hsien (TW)

( * ) Notice: Subject to any disclaimer, the term of this patent is extended or adjusted under 35 U.S.C. 154(b) by 575 days.

(21) Appl. No.: 12/793,221

(22) Filed: Jun. 3, 2010

(65) Prior Publication Data

US 2010/0309164 A1    Dec. 9, 2010

(30) Foreign Application Priority Data

Jun. 5, 2009  (TW) ............................... 98118789 A

(51) Int. Cl.
    *G06F 3/041* (2006.01)
(52) U.S. Cl.
    USPC .......................................... 345/173
(58) Field of Classification Search
    USPC .................................. 345/173–179
    See application file for complete search history.

(56) References Cited

U.S. PATENT DOCUMENTS

| | | | |
|---|---|---|---|
| 8,274,494 B2 * | 9/2012 | Frey et al. ...................... | 345/174 |
| 2003/0231169 A1 * | 12/2003 | Aroyan et al. ................ | 345/173 |
| 2007/0279395 A1 * | 12/2007 | Philipp et al. ................. | 345/173 |
| 2008/0041641 A1 | 2/2008 | Geaghan et al. | |
| 2008/0316187 A1 * | 12/2008 | Sano et al. ..................... | 345/173 |
| 2009/0085894 A1 * | 4/2009 | Gandhi et al. ................ | 345/175 |
| 2010/0302201 A1 * | 12/2010 | Ritter et al. ................... | 345/174 |

FOREIGN PATENT DOCUMENTS

| | | |
|---|---|---|
| CN | 100422919 C | 10/2008 |
| TW | 200901014 A | 1/2009 |
| TW | 355395 M | 4/2009 |
| TW | 200915163 A | 4/2009 |

* cited by examiner

*Primary Examiner* — Waseem Moorad
(74) *Attorney, Agent, or Firm* — Rabin & Berdon, P.C.

(57) ABSTRACT

The disclosure is related to a touch panel with a micro-electrode matrix. It is formed by a plurality of x-axis scanning line, a plurality of y-axis scanning line and a micro-electrode matrix defined by each of the scanning lines, wherein the micro-electrode matrix is formed by the plurality of micro-electrode series in x-axis connected to the scanning line in x-axis and the plurality of micro-electrode series in y-axis connected to the scanning line in y-axis. Each of the micro-electrode chains is composed by the plurality of micro-electrode and series resistances.

7 Claims, 13 Drawing Sheets

MICRO-ELECTRODE MATRIX AND A TOUCH PANEL WITH A MICRO-ELECTRODE MATRIX

CROSS-REFERENCES TO RELATED APPLICATIONS

This non-provisional application claims priority under 35 U.S.C. §119(a) on Patent Application No. 98118789 filed in Taiwan, R.O.C. on Jun. 5, 2009, the entire contents of which are hereby incorporated by reference.

BACKGROUND

1. Technical Field

The disclosure relates to a touch panel, in particular, to a micro-electrode matrix and a touch panel with a micro-electrode matrix.

2. Related Art

Nowadays, the most popular touch panels sold in the market are generally classifiable as resistive-type and capacitive-type touch panels. The resistive-type also can be classified into 4-wire resistive-type, 5-wire resistive-type, 6-wire resistive-type and 8-wire resistive-type. The capacitive-type can be classified into the surface capacitance touch screen (SCT) and the projective capacitive touch screen (PCT), which are also referred to as digital-touch technology. The resistive-type and the surface capacitance touch screen (SCT) are generally referred to as analog-touch technology.

Since the touch panel technology of projective capacitive type is applied the calculation of the algorithm and the concept of the scanning in x-axis and in y-axis, the purpose of detection of multiple points can be met. Therefore, it is the favorite of the touch panel industry, with the iPhone being a particularly successful example.

However, in order to obtain greater touch precision, the design of the projective capacitive touch screen has to make the touched fingers touch a plurality of scanning lines. Please refer to FIG. 1, which is a schematic diagram of the electrode structure of a diamond-shaped projective capacitive touch panel of the related prior art. The electrode layer in x-axis 10 and the electrode layer in y-axis 20 are arranged in a cross. When touch point S1 is contacted, it touches all of the scanning lines in x-axis of X1, X2, X3, X4 and the scanning lines in y-axis of Y1, Y2, Y3, Y4. In touch detection, an increase in density of scanning lines increases detection precision. For this reason, this kind concept is now becoming the standard projective capacitive touch panel type.

The design of the plurality of scanning line is much easier to form on a small sized touch panel. However, surplus scanning lines are encountered in large sized touch panels. Comparatively, the scanning circuit (or the controlled circuit), in the projective capacitive touch panel of big size must suffer which is accompanied by a large number of controlled circuits. The current solution is to use a controlled chip for a multiple scanning circuit.

In addition, precise touch detection of the projective capacitive touch panel of the related art only can be achieved through the detection of the capacitance variation of the multiple scanning lines. The latter is a burden of the calculation of touch detection.

Therefore, a means of reducing the number of scanning lines and achieving high precision detection are key points of touch panel technology development.

SUMMARY

According to the problem of the prior art, the disclosure provides a touch panel with a micro-electrode matrix, including: a substrate; an first electrode layer and a second electrode layer, isolated and formed on the substrate; a plurality of scanning lines in first axis, formed on the first electrode layer, connected to a scanning voltage for the detection of capacitive variation; a plurality of scanning lines in second axis, formed on the second electrode layer, connected to a scanning voltage for the detection of capacitive variation; a plurality of micro-electrode chains in first axis, formed on the first electrode layer, connected to place between the adjacent plurality of scanning lines in first axis; and a plurality of micro-electrode chains in second axis, formed on the second electrode layer, connected to place between the adjacent plurality of scanning lines in second axis.

The disclosure further provides a micro-electrode matrix, formed on the touch panel with the scanning lines in first axis and the scanning lines in second axis, including: a plurality of micro-electrode chains in first axis, connected between the adjacent plurality of scanning lines in first axis, and a plurality of micro-electrode chains in second axis, formed on electrode layer in y-axis, connected between the adjacent plurality of scanning lines in y-axis.

The detailed features and advantages of the disclosure will be described in detail in the following embodiments. Those skilled in the arts can easily understand and implement the content of the disclosure. Furthermore, the relative objectives and advantages of the disclosure are apparent to those skilled in the arts with reference to the content disclosed in the specification, claims, and drawings.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 1:
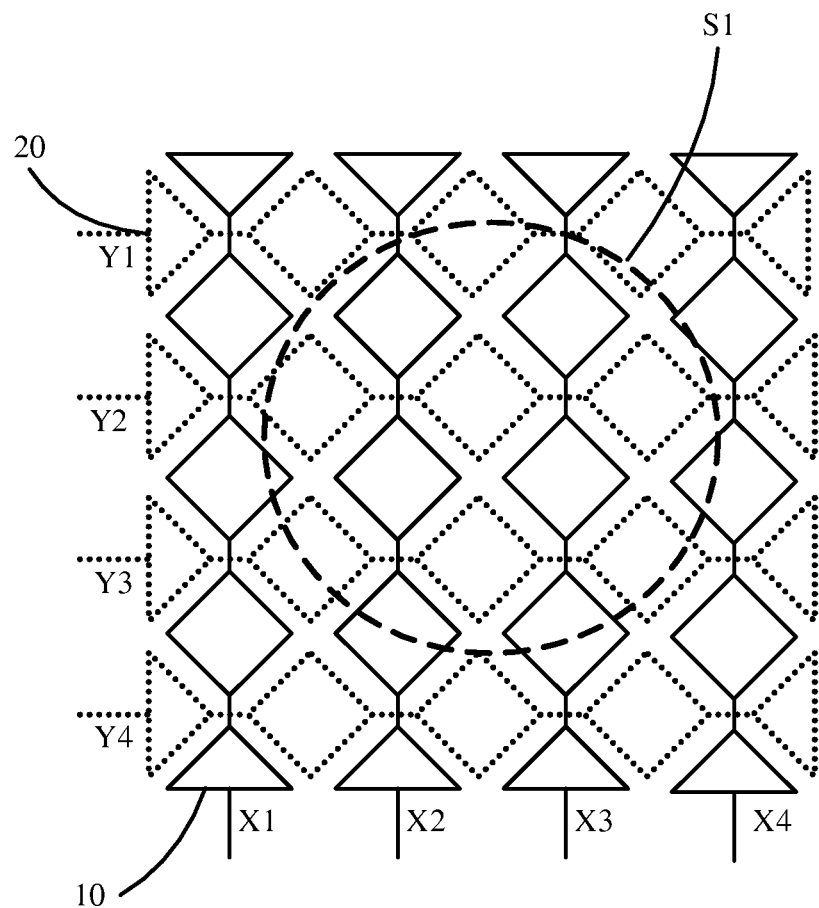
FIG. 1 is a schematic diagram of the electrode structure of diamond-type projective capacitive touch panel of the prior art.
Figure 2:
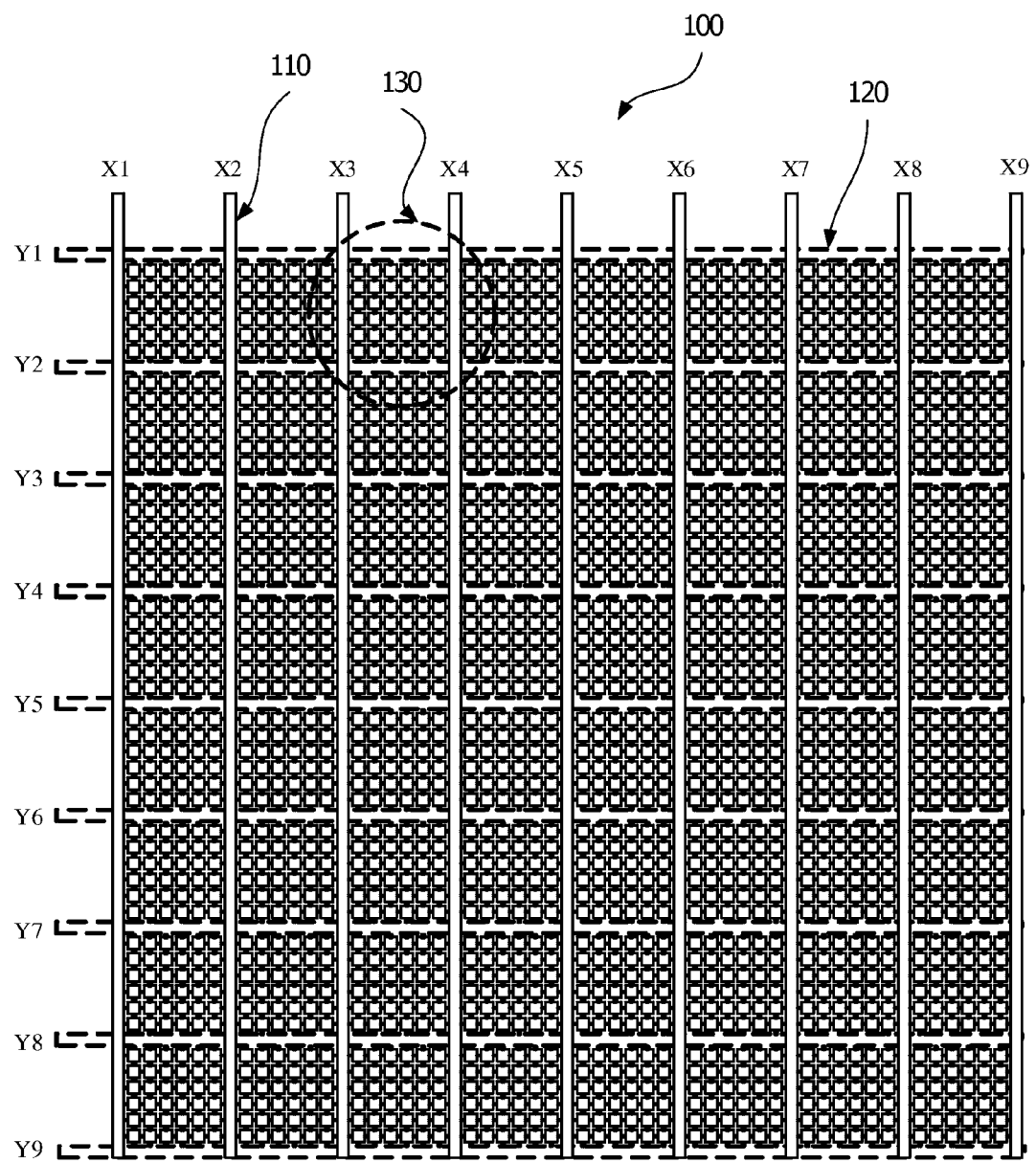
FIG. 2 is a schematic diagram of the projective capacitive touch panel with micro-electrode matrix of the disclosure.

Firstly, please refer to FIG. 2, which is a schematic diagram of projective capacitive touch panel with a micro-electrode matrix 100 of the disclosure. It includes: a substrate (not shown); an electrode layer in x-axis, formed on the substrate; an electrode layer in y-axis, separated and formed on the electrode layer in x-axis; a plurality of scanning lines in x-axis 120, formed on the electrode layer in x-axis and connected to external scanning circuit is used for receiving the scanning voltage provided by the scanning circuit, further to forming the touch detection; a plurality of micro-electrode chains in x-axis, formed on electrode layer in x-axis, connected between the adjacent plurality of scanning lines in x-axis; and a plurality of micro-electrode chains in y-axis, formed on electrode layer in y-axis, connected between the adjacent plurality of scanning lines in y-axis.

In FIG. 2, there are nine scanning lines in x-axis, which are X1, X2, X3, X4, X5, X6, X7, X8 and X9. There are nine scanning lines in y-axis, which are Y1, Y2, Y3, Y4, Y5, Y6, Y7, Y8 and Y9. The eighteen scanning lines in x-axis and in y-axis define sixty-four blocks. There is a micro-electrode matrix 130 formed by the micro-electrode in x-axis and the micro-electrode in y-axis within each of these blocks. The micro-electrode matrix is designed to define the touch position precisely, fulfilling the purpose of achieving the best touch resolution using the least number of scanning lines.

Figure 3:
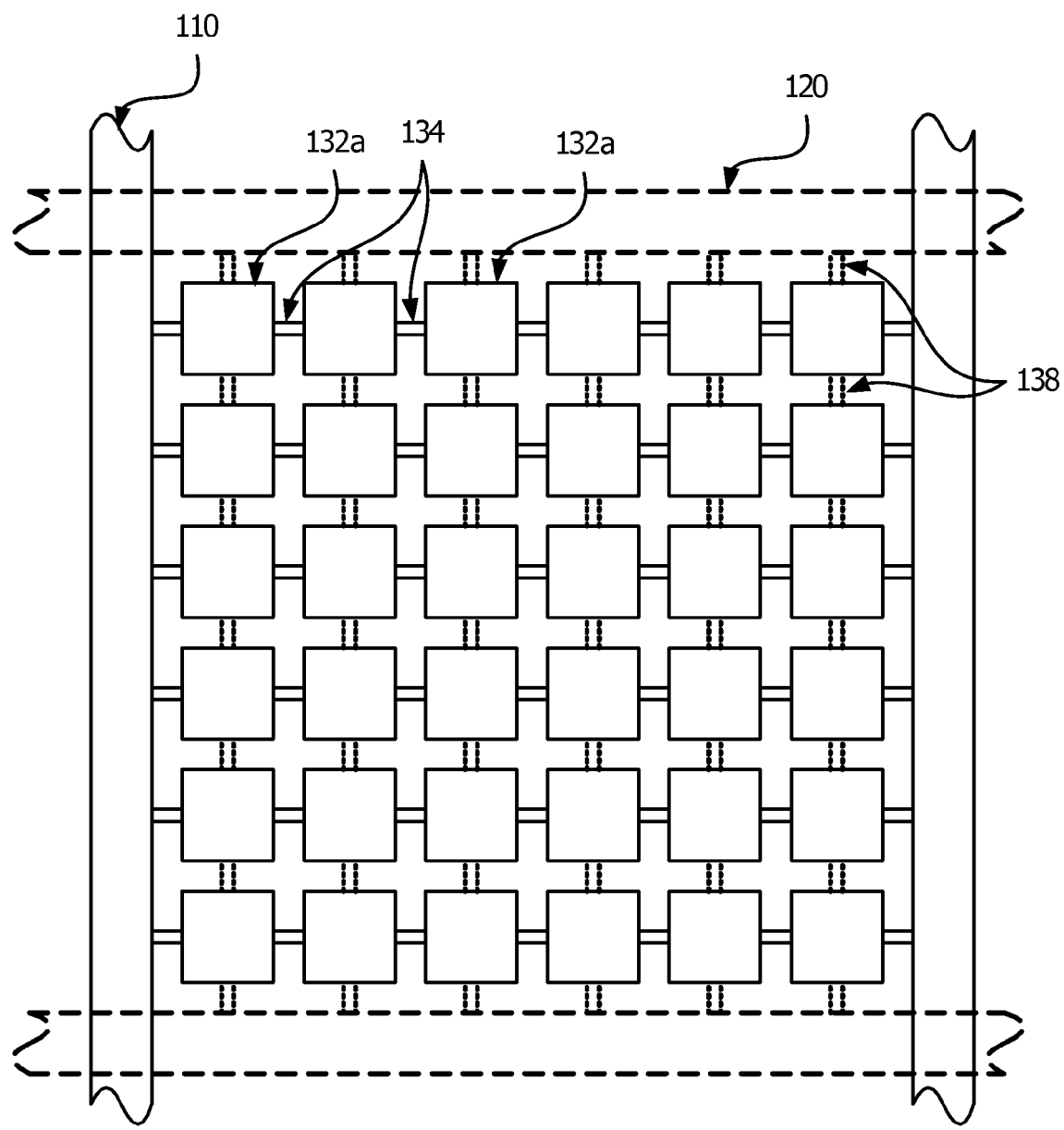
FIG. 3 is a top view and magnified diagram of the first embodiment of the micro-electrode matrix of the disclosure.

Please refer FIG. 3, which is a top view and magnified diagram of the first embodiment of the micro-electrode matrix of the disclosure. Each of the micro-electrode matrixes includes: a micro-electrode chains in x-axis and a micro-electrode chains in y-axis, wherein, the micro-electrode chains in x-axis is formed by the plurality of micro-electrode in x-axis 132*a* and the series resistances in x-axis 134 which connect the micro-electrode in x-axis 132*a*. The micro-electrode chains in y-axis is formed by the plurality of micro-electrode in y-axis 136*a* (not shown), and the series resistances in y-axis 138, which makes the micro-electrode in y-axis 136*a* to be connected, wherein, the series resistances in x-axis 134 further connect the micro-electrode in x-axis 132*a* and the scanning lines in x-axis 110, and connect the micro-electrode in y-axis 136*a* and the scanning lines in y-axis 120.

Furthermore, in the embodiment in FIG. 3, both of the plurality of micro-electrode in x-axis 132*a* and the plurality of micro-electrode in y-axis 136*a* (not shown) form a quadrilateral structure. In general, a rectangle is adopted in the design. In addition, the plurality of micro-electrode in x-axis 132*a* and the plurality of micro-electrode in y-axis 136*a* overlap at top and bottom. The interval between each of the plurality of micro-electrodes is between 1 um to 1000 um.

Using this kind of overlapping design of the plurality of micro-electrode in x-axis 132*a* and the plurality of micro-electrode in y-axis 136*a*, the micro-electrode can generate the induced magnitude of different kinds when the fingers touch different points. Therefore, the induced gradient within each scanning can be drawn up precisely within each scanning line, further to achieving the purpose of obtaining the best touch resolution using the least number of scanning lines.

For example, the interval of the scanning lines of an embodiment is six times 5 mm in the related art, that is, 30 mm. The precision of the related art can be met by using six micro-electrodes. Furthermore, double the precision of the related art can be achieved with less scanning lines if twelve micro-electrodes are adopted.

In the following paragraphs, the structure of a two electrode layers of the micro-electrode matrix in FIG. 3 is described.

Figure 4:
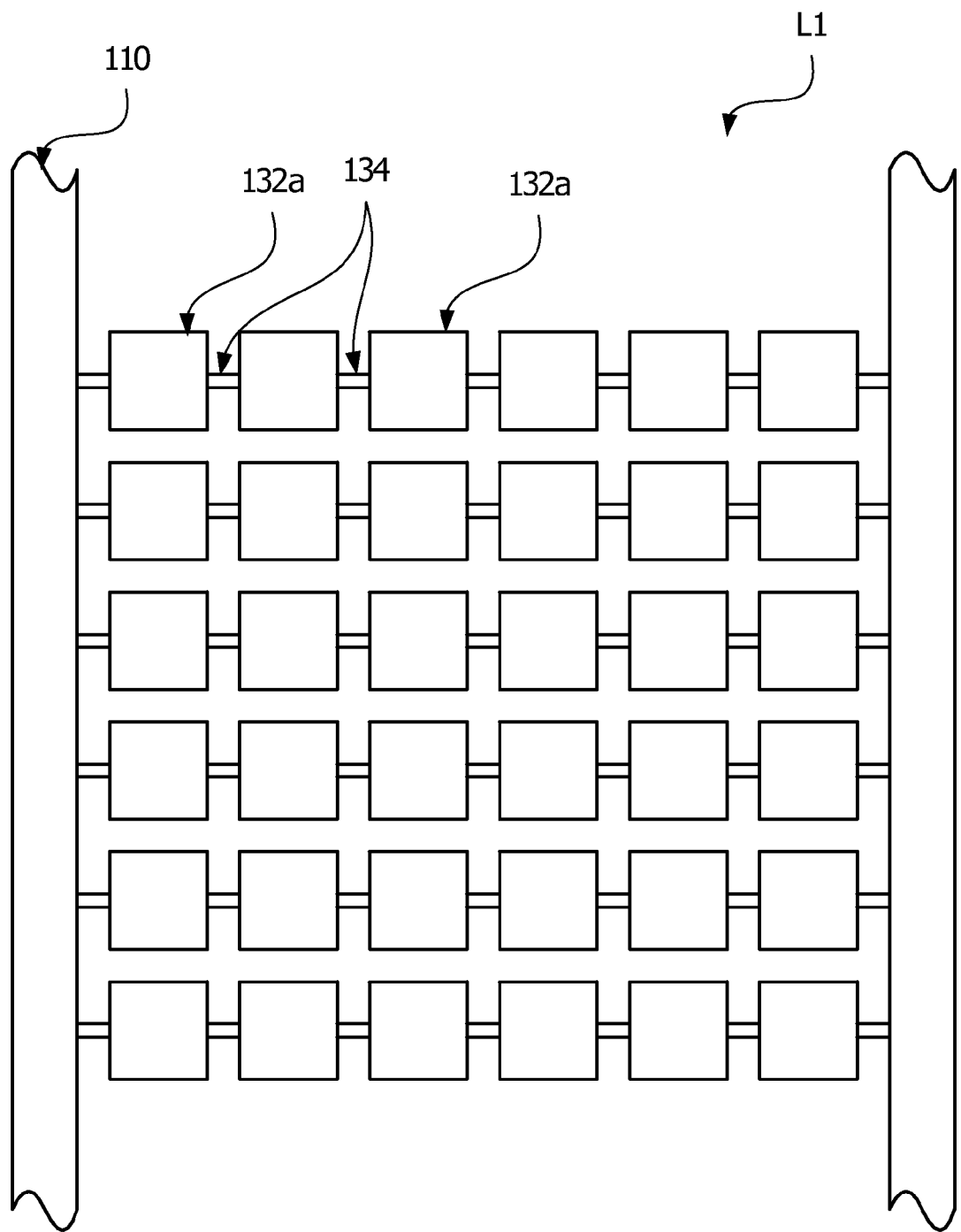
FIG. 4 is a top view diagram of the first electrode layer L1 of the micro-electrode matrix 130 in FIG. 3.

Please refer to FIG. 4, which is a top view diagram of the first electrode layer L1 of the micro-electrode matrix 130 in FIG. 3. The first electrode layer L1 includes the scanning lines in x-axis 110 and the micro-electrode chains in x-axis, that is, the structure formed by the plurality of micro-electrode in x-axis 132*a* and the series resistances in x-axis 134. The series resistances in x-axis 134 make the places within the micro-electrode in x-axis 132*a* are connected in series, also make the micro-electrode in x-axis 132*a* and the scanning lines in x-axis 110 to be connected.

Figure 5:
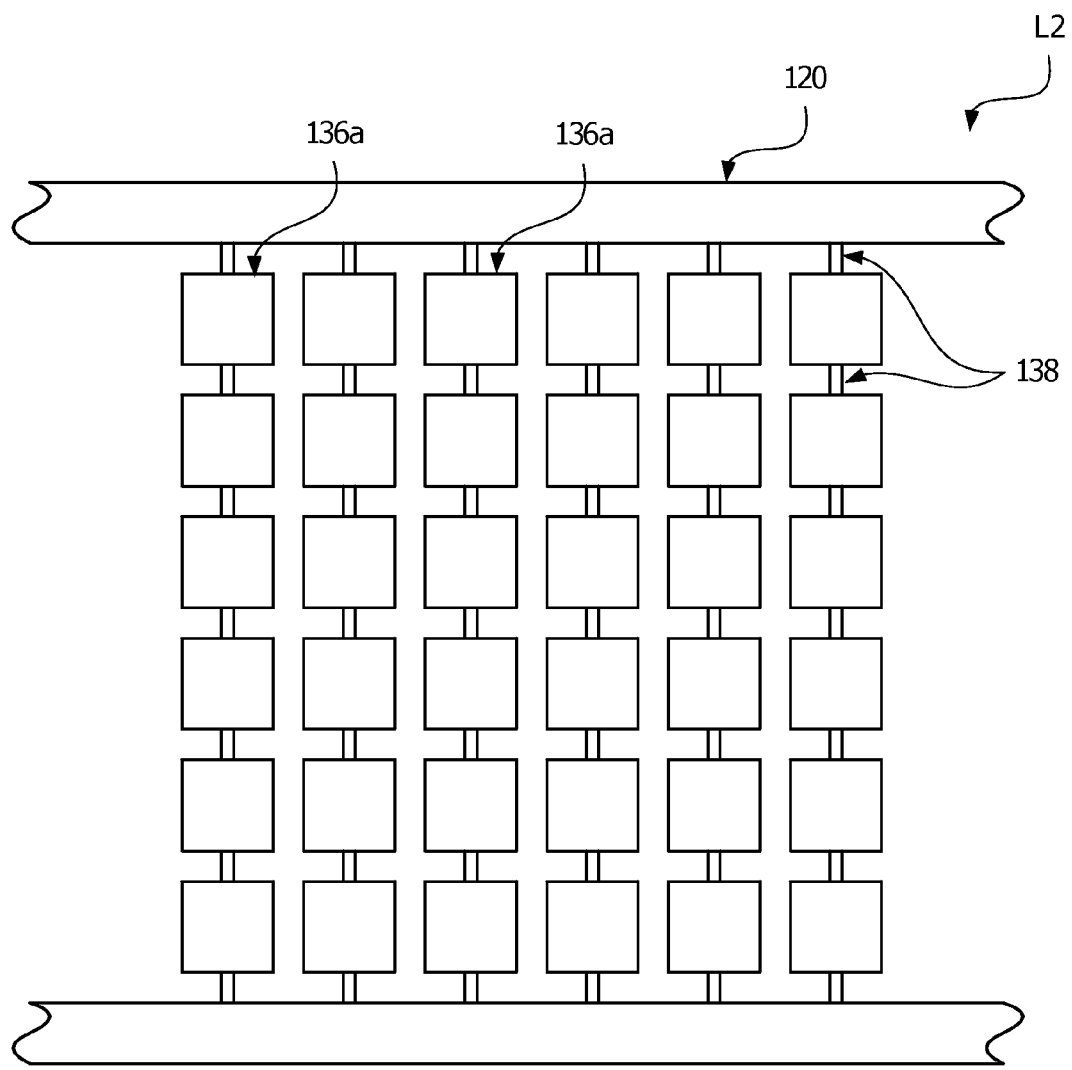
FIG. 5 is a top view diagram of the second electrode layer L2 of the micro-electrode matrix 130 in FIG. 3.

Please refer to FIG. 5, which is a top view diagram of the second electrode layer L2 of the micro-electrode matrix 130 in FIG. 3. The second electrode layer L2 includes the scanning lines in y-axis 120 and the micro-electrode chains in y-axis, namely, the structure formed by the plurality of micro-electrode in y-axis 136*a* and the series resistances in y-axis 138. The series resistances in y-axis 138 ensure that the places within the micro-electrode in y-axis 136*a* are connected in series, and also connect the micro-electrode in y-axis 136*a* and the scanning lines in y-axis 120.

With regard to the electrode structure in FIG. 3, the induced magnitude is limited by the interval of the micro-electrode while forming the touch, since the plurality of micro-electrode in x-axis 132*a* and the plurality of micro-electrode in y-axis 136*a* overlap at top and bottom. When in use, if the guiding holes are added on the micro-electrode of touch position of the fingers, the electromagnetic field can easily pass through, further improve the sensitivity.

Figure 6:
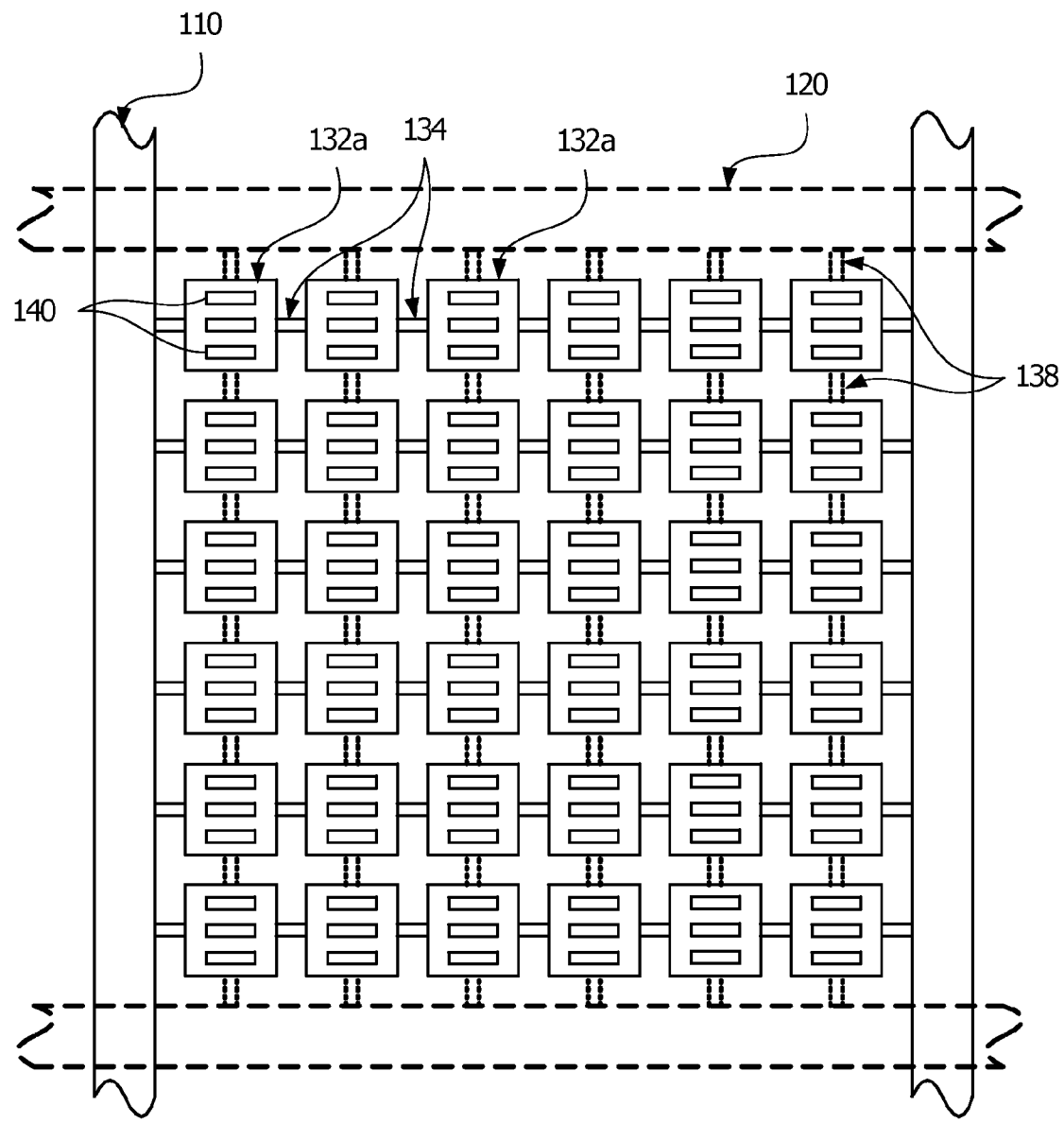
FIG. 6 is a top view and magnified diagram of the second embodiment of the micro-electrode matrix of the disclosure.

Please refer FIG. 6, which is a top view and magnified diagram of the second embodiment of the micro-electrode matrix of the disclosure. It describes the adoption of the guiding holes 140 in the design. In comparison with FIG. 6 and FIG. 3, it is discovered that both of basic structures are the same. The only difference is that the guiding holes 140 are added to the plurality of micro-electrode in x-axis 132*a* in the design. To improve the flux of the electromagnetic field, at least one of the guiding holes 140 can be designed on the plurality of micro-electrode in x-axis 132*a*.

Figure 7:
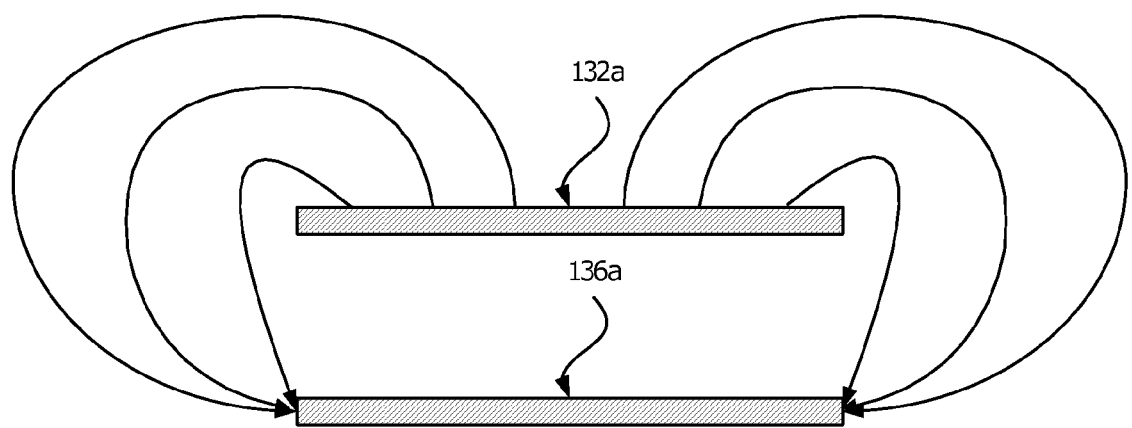
FIG. 7 is a cross section diagram of the micro-electrode matrix in FIG. 3, which shows the condition of an electromagnetic field induced by touch.
Figure 8:
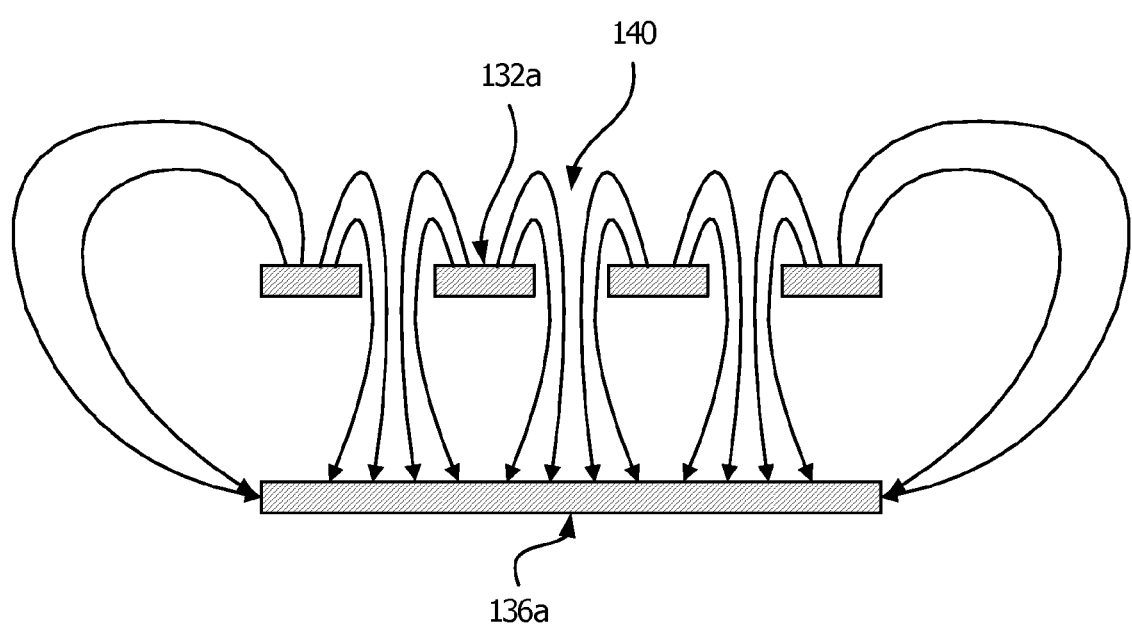
FIG. 8 is a cross section diagram of the micro-electrode matrix in FIG. 6, which shows the condition of an electromagnetic field induced by touch.

The benefits of the guiding holes 140 are shown in FIG. 7 and FIG. 8. FIG. 7 is a cross section diagram of the micro-electrode matrix in FIG. 3, which is also the condition of the electromagnetic field induced when touch happens. FIG. 8 is a cross section diagram of the micro-electrode matrix in FIG. 6, which is also the condition of electromagnetic field induced when touch appears. In comparison of FIG. 7 and FIG. 8, the induced magnitude increases since the addition of guiding holes 140 in FIG. 8 increases the flux of the electromagnetic field. The shape of the guiding holes 140 is not limited to a rectangular shape, other proper shapes such as squares, rectangulars, circles, triangles, lines, rectangulars with square block and squares with square block, etc, are also candidates.

Other than the rectangular design, other shape design of the micro-electrode may be adopted. For example: circle design, the diamond shape of the related art, that is the design of rhombus, may also be adopted.

Figure 9:
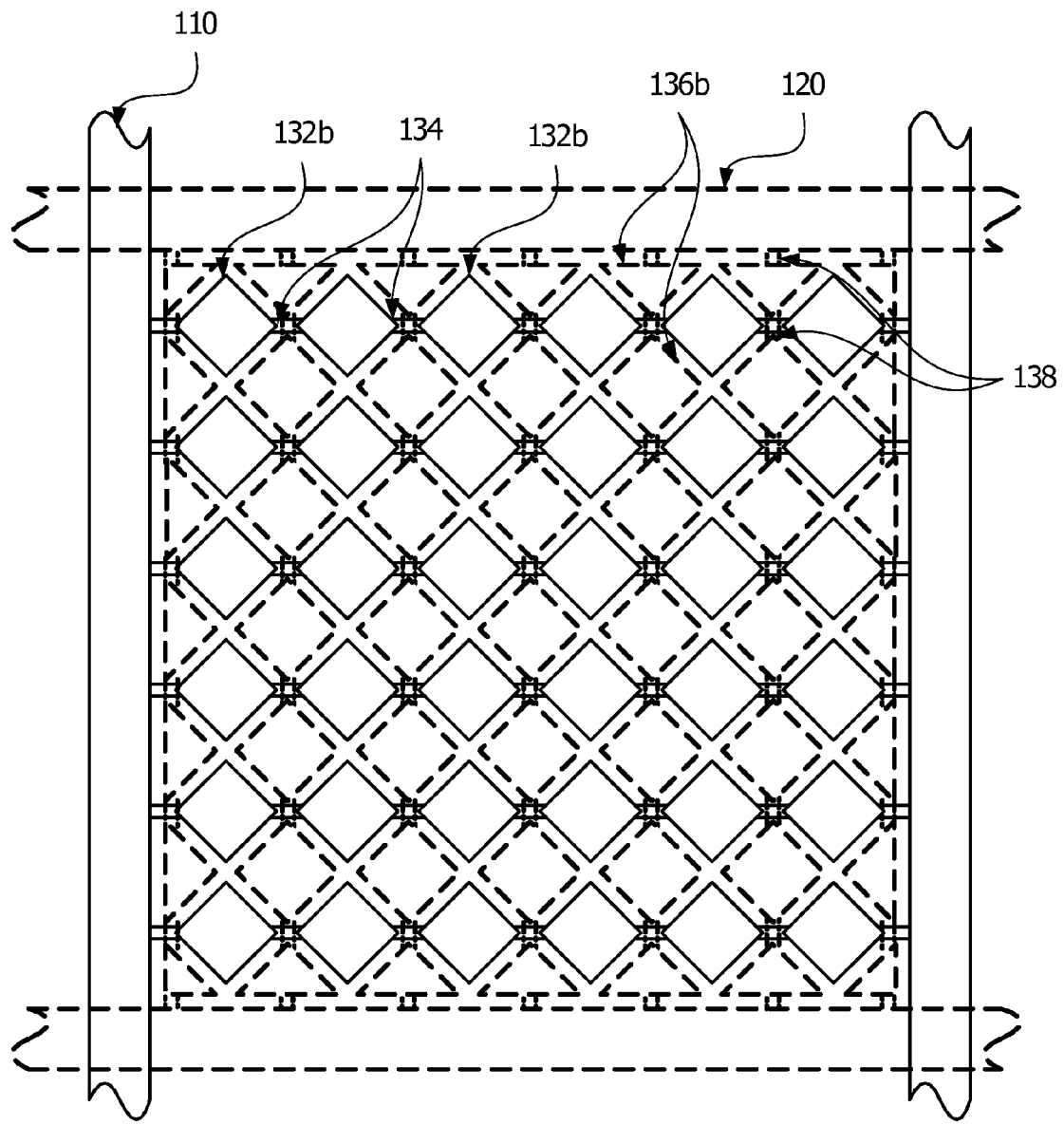
FIG. 9 is a top view and magnified diagram of the third embodiment of the micro-electrode matrix of the disclosure.

Please refer to FIG. 9, which is a top view and magnified diagram of the third embodiment of the micro-electrode matrix of the disclosure. It is the basic structure in the design of the related art. The difference between the related art and disclosure is that that the plurality of micro-electrodes in x-axis 132*a* are connected to each other by the series resistances in x-axis 134, and finally connected on the scanning lines in x-axis 110, and formed as the micro-electrode chains. The plurality of micro-electrode chains is formed as a micro-electrode matrix so that the plurality of micro-electrode in y-axis 136*b* is connected to each other by the series resistances in y-axis 138, and finally connected on the scanning lines in y-axis 120 and formed as the micro-electrode chains. The plurality of micro-electrode chains are composed as a micro-electrode matrix. There is a micro-electrode matrix in the block enclosed by the scanning line. This kind of design can meet the purpose of achieving the best touch resolution using the least number of scanning lines.

Furthermore, the difference in FIG. 9 and FIG. 3 is that the plurality of micro-electrode in x-axis 132b and the plurality of micro-electrode in y-axis 136b are arranged in a cross, not in the corresponding arrangement of top and down.

Figure 10:
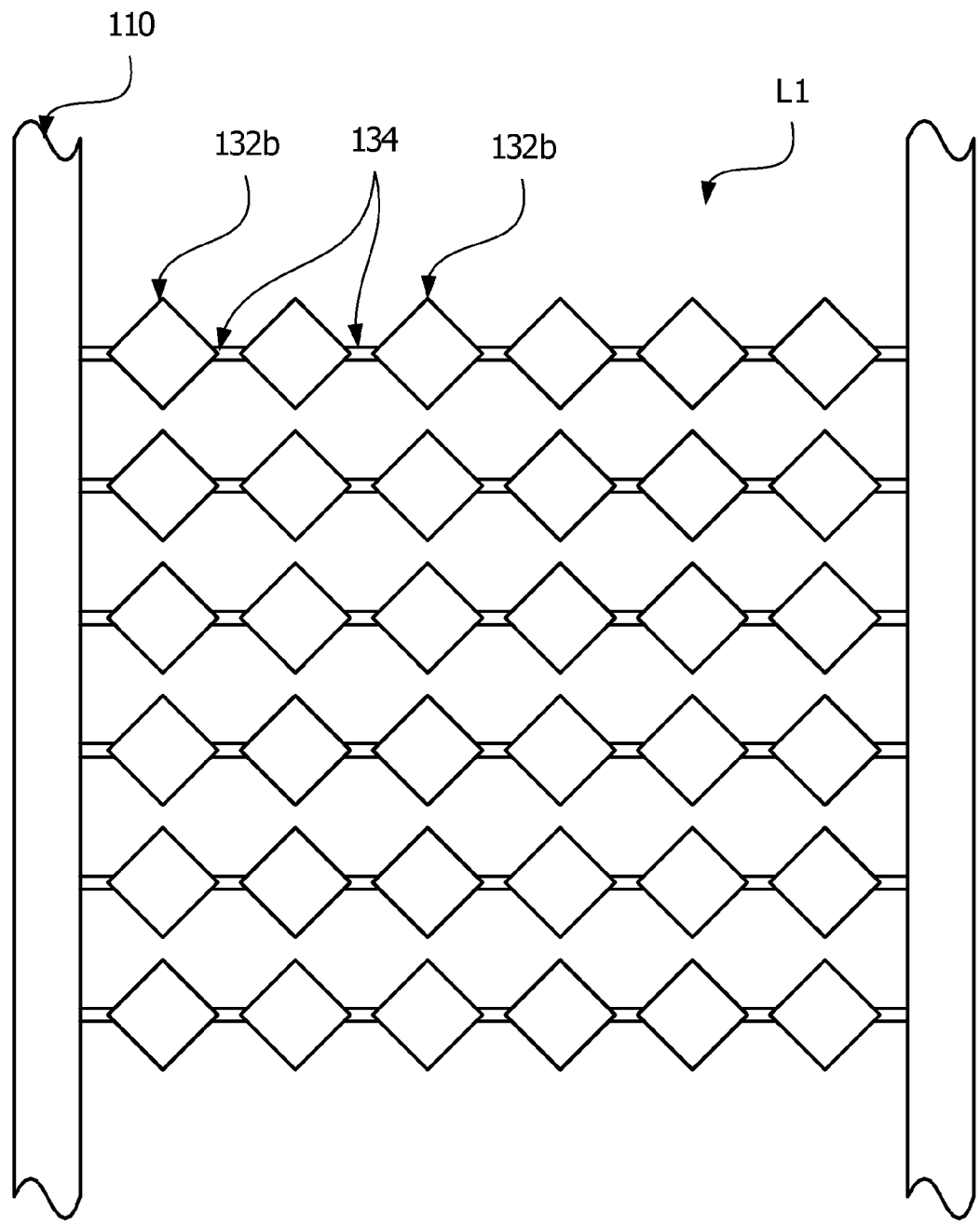
FIG. 10 is a top view diagram of the first electrode layer L1 of the micro-electrode matrix in FIG. 9.

Please refer FIG. 10, which is a top view diagram of the first electrode layer L1 of the micro-electrode matrix in FIG. 9. The first electrode layer L1 includes the scanning lines in x-axis 110 and the micro-electrode chains in x-axis, that is, the structure formed by the plurality of micro-electrode in x-axis 132b and the series resistances in x-axis 134. The series resistances in x-axis series resistances 134 ensure the places within the micro-electrode in x-axis 132b are connected in series, and also connect the micro-electrode in x-axis 132b and the scanning lines in x-axis 110.

Figure 11:
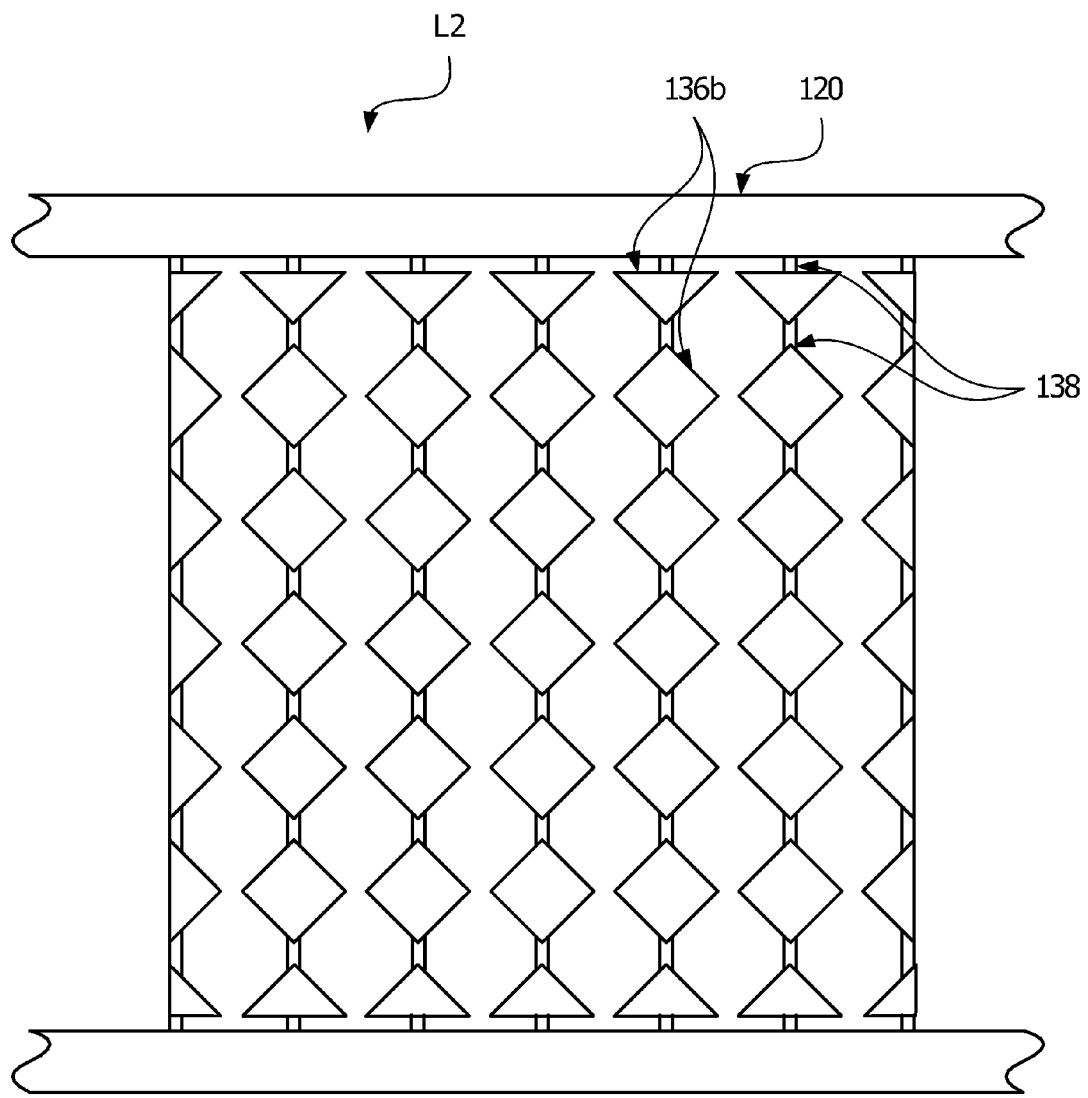
FIG. 11 is a top view diagram of the second electrode layer L2 of the micro-electrode matrix in FIG. 9.

Please refer to FIG. 11, which is a top view diagram of the second electrode layer L2 of the micro-electrode matrix in FIG. 9. The second electrode layer L21 includes the scanning lines in y-axis 120 and the micro-electrode chains in y-axis, that is, the structure formed by the plurality of micro-electrodes in y-axis 136b and the series resistances in y-axis 138. The series resistances in y-axis 138 ensure the places within the micro-electrode in y-axis 136b connected in series, and also connect the micro-electrode in y-axis 136b and the scanning lines in y-axis 120.

The design in FIG. 9 can be improved by the addition of a pair of dummy electrodes to increase the precision and by addition of the guiding holes to increase the sensitivity.

Figure 12:
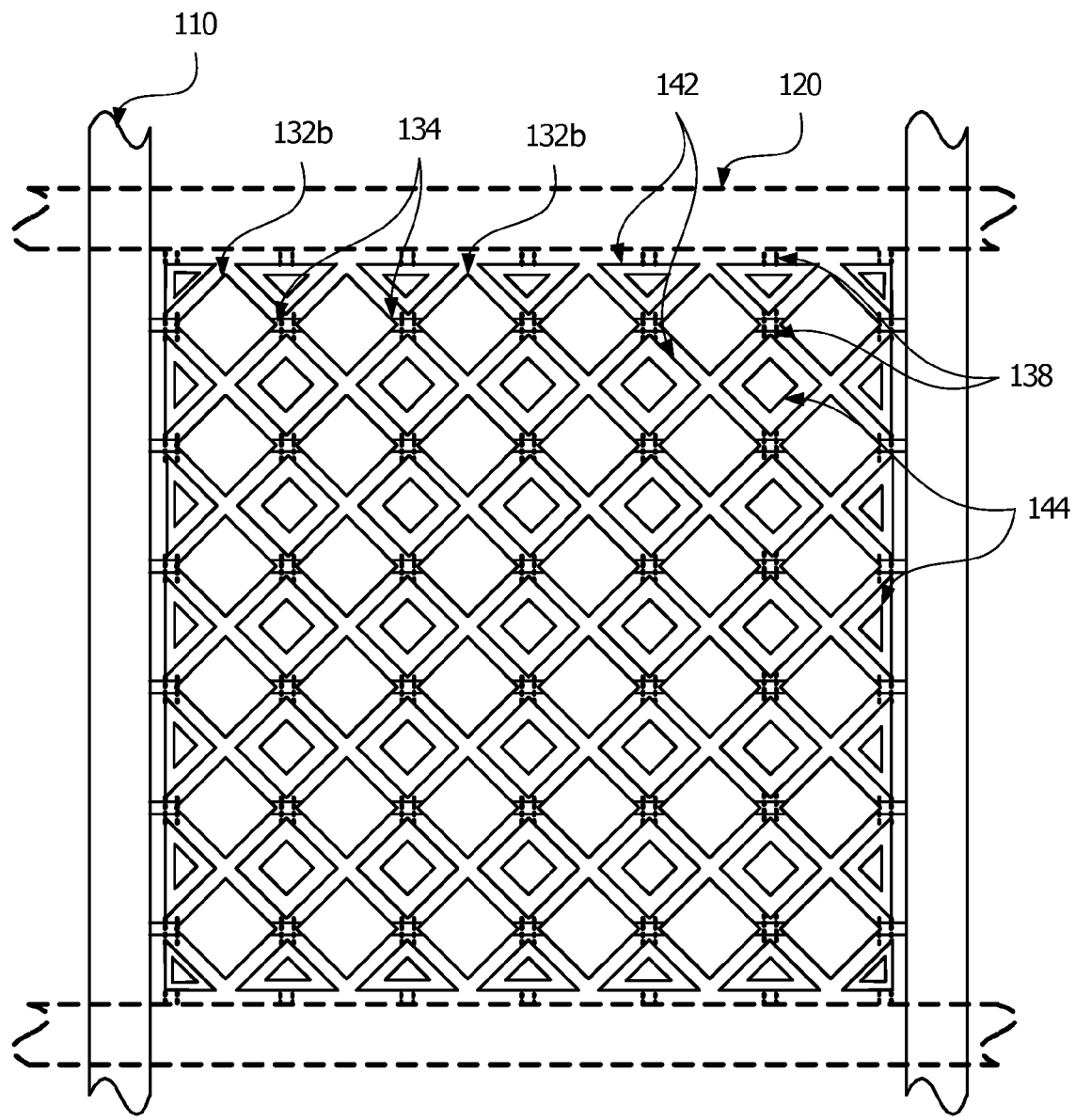
FIG. 12 is a top view and magnified diagram of the fourth embodiment of the micro-electrode matrix of the disclosure.

Please refer to FIG. 12, which is a top view and magnified diagram of the fourth embodiment of the micro-electrode matrix of the disclosure. From FIG. 12, it is discovered that the dummy electrodes 142 is added on the top of the plurality of micro-electrodes in y-axis 136b. Furthermore, the guiding holes 144 are designed in the dummy electrodes 142. However, the dummy electrodes 142 and the plurality of micro-electrodes in x-axis 132b are designed on the electrode layer, namely, the first electrode layer L1 which is floating connected, and not connected on the plurality of micro-electrodes in x-axis 132b.

Using the design of the dummy electrode 142, a certain induced magnitude can be generated while the fingers touch the position of dummy electrode 142, and generate the induced magnitude on the plurality of micro-electrodes in y-axis 136b under the dummy electrode 142.

Furthermore, the design of guiding holes 144 also increases the flux of electromagnetic field, and further increases sensitivity. The shape of the guiding holes 144 is not limited to a square and other proper shapes such as rectangulars, circles, triangles, lines, rectangulars with square block and squares with square block, etc, may also be candidates.

Figure 13:
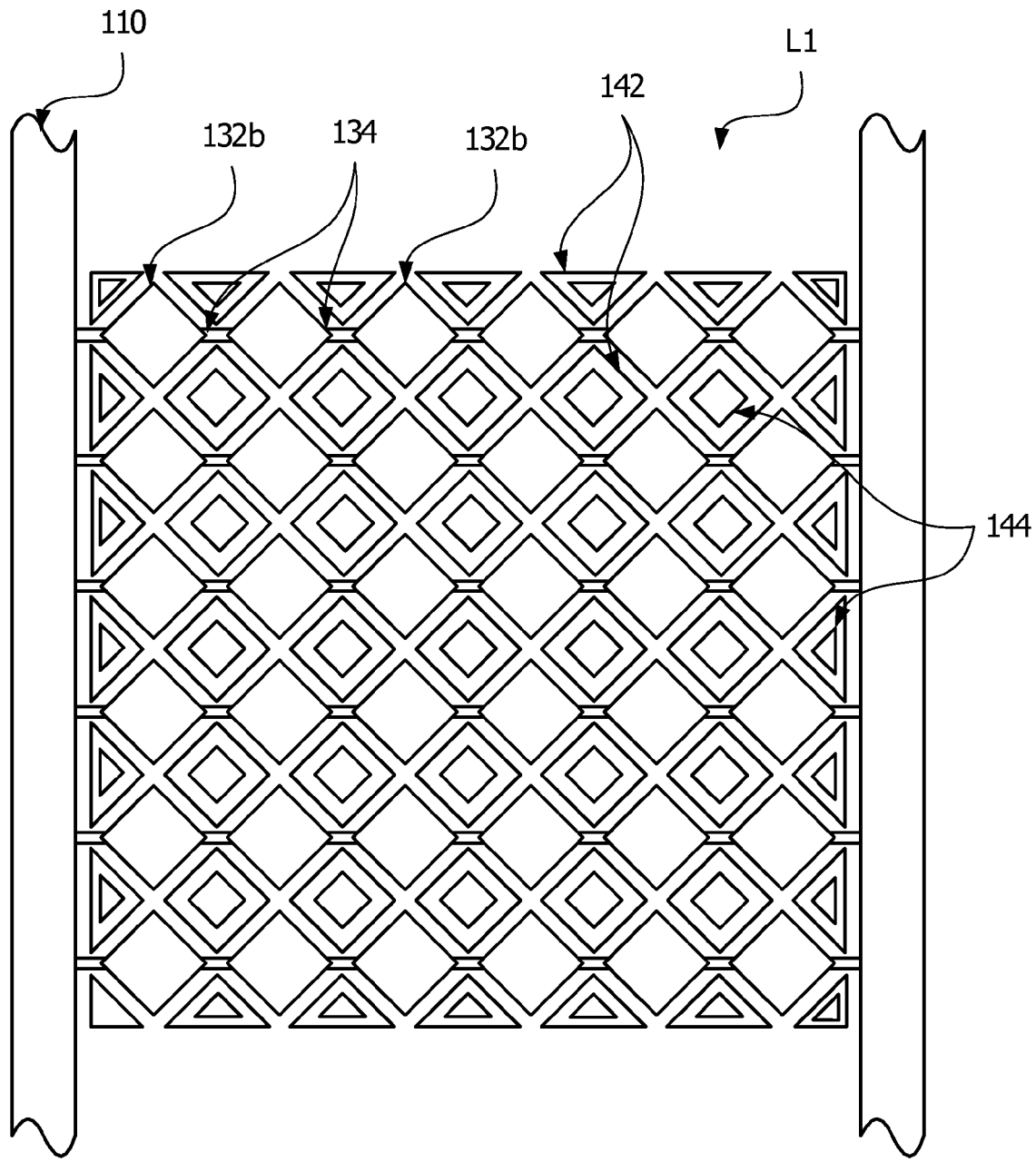
FIG. 13 is a top view diagram of the first electrode layer L1 of the micro-electrode matrix in FIG. 9.

Please refer to FIG. 13, which is a top view diagram of the first electrode layer L1 of the micro-electrode matrix in FIG. 9. From FIG. 13, it is discovered that high impedance is formed between the plurality of micro-electrodes in x-axis 132b and the dummy electrode 142, which adopts the floating connection design.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touch panel with a micro-electrode matrix, comprising:
 a substrate;
 a first electrode layer and a second electrode layer, isolated and formed on the substrate;
 a plurality of scanning lines in first axis, formed on the first electrode layer, connected to a scanning voltage for the detection of capacitive variation;
 a plurality of scanning lines in second axis, formed on the second electrode layer, connected to a scanning voltage for the detection of capacitive variation; and
 a plurality of micro-electrode matrixes, formed within a block defined by the plurality of scanning lines in x-axis and the plurality of scanning lines in y-axis, each of the micro-electrode matrixes comprising:
  a plurality of micro-electrode chains in first axis, formed on the first electrode layer, connected to a place between adjacent ones of the plurality of scanning lines in first axis, each of the micro-electrode chains in first axis comprising:
   a plurality of micro-electrodes in first axis, separated and formed on the first electrode layer; and
   a plurality of series resistances in first axis, connected individually between the plurality of micro-electrodes in first axis and forming the micro-electrode chain in first axis, two of the series resistances in first axis forming two ends of each of the micro-electrode chains in first axis;
  a plurality of micro-electrode chains in second axis, formed on the second electrode layer, connected to a place between adjacent ones of the plurality of scanning lines in second axis, each of the micro-electrode chains in second axis comprising:
   a plurality of micro-electrodes in second axis, separated and formed on the second electrode layer, wherein the plurality of micro-electrodes in first axis and the plurality of micro-electrodes in second axis correspond to each other; and
   a plurality of series resistances in second axis, connected individually between the plurality of micro-electrodes in second axis and forming the micro-electrode chains in second axis, two of the series resistances in second axis forming two ends of each of the micro-electrode chains in second axis; and
  a plurality of guiding holes, at least one of the plurality of guiding holes is formed on each of the plurality of micro-electrodes in first axis, the guiding holes used for enhancing the flux of the electromagnetic field.

2. A touch panel with a micro-electrode matrix, comprising:
 a substrate;
 a first electrode layer and a second electrode layer, isolated and formed on the substrate;
 a plurality of scanning lines in first axis, formed on the first electrode layer, connected to a scanning voltage for the detection of capacitive variation;
 a plurality of scanning lines in second axis, formed on the second electrode layer, connected to a scanning voltage for the detection of capacitive variation; and
 a plurality of micro-electrode matrixes, formed within a block defined by the plurality of scanning lines in x-axis and the plurality of scanning lines in y-axis, each of the micro-electrode matrixes comprising:

a plurality of micro-electrode chains in first axis, formed on the first electrode layer, connected to a place between adjacent ones of the plurality of scanning lines in first axis, each of the micro-electrode chains in first axis comprising:
   a plurality of micro-electrodes in first axis, separated and formed on the first electrode layer; and
   a plurality of series resistances in first axis, connected individually between the plurality of micro-electrodes in first axis and forming the micro-electrode chain in first axis, two of the series resistances in first axis forming two ends of each of the micro-electrode chains in first axis;
a plurality of micro-electrode chains in second axis, formed on the second electrode layer, connected to a place between adjacent ones of the plurality of scanning lines in second axis, each of the micro-electrode chains in second axis comprising:
   a plurality of micro-electrodes in second axis, separated and formed on the second electrode layer, wherein the plurality of micro-electrodes in first axis and the plurality of micro-electrodes in second axis correspond to each other in a cross formation; and
   a plurality of series resistances in second axis, connected individually between the plurality of micro-electrodes in second axis and forming the micro-electrode chains in second axis, two of the series resistances in second axis forming two ends of each of the micro-electrode chains in second axis;
a plurality of dummy electrodes, formed on the first electrode layer, individually corresponding to the plurality of micro-electrodes in second axis; and
a plurality of guiding holes, at least one of the plurality of guiding holes formed on the plurality of micro-electrodes in first axis, used for enhancing the flux of electromagnetic field.

3. The touch panel according to claim 2 wherein the interval between the plurality of micro-electrodes in first axis and the interval between the plurality of micro-electrodes in first axis are between 1 um and 1000 um.

4. A micro-electrode matrix, formed on a touch panel with a plurality of scanning lines in first axis and a plurality of scanning lines in second axis, where the touch panel with the plurality of scanning lines in first axis and the plurality of scanning lines in second axis are isolated from each other, comprising:
a plurality of micro-electrode chains in first axis, connected between adjacent ones of the plurality of scanning lines in first axis, each of the micro-electrode chains in first axis comprising:
   a plurality of micro-electrodes in first axis, separated and formed on the first electrode layer; and
   a plurality of series resistances in first axis, connected individually between the plurality of micro-electrodes in first axis and forming the micro-electrode chain in first axis, two of the series resistances in first axis form two ends of each of the micro-electrode chains in first axis; and
a plurality of micro-electrode chains in second axis, connected between the adjacent plurality of scanning lines in second axis, each of the micro-electrode chains in second axis comprising:
   a plurality of micro-electrodes in second axis, separated and formed on the second electrode layer, wherein the plurality of micro-electrodes in first axis and the plurality of micro-electrodes in second axis correspond to each other; and
   a plurality of series resistances in second axis, connected individually between the plurality of micro-electrodes in second axis and forming the micro-electrode chains in second axis, two of the series resistances in second axis forming two ends of each of the micro-electrode chains in second axis; and
a plurality of guiding holes, at least one of the plurality of guiding holes formed on the plurality of micro-electrodes in first axis, used for enhancing the flux of electromagnetic field;
wherein the micro-electrode matrix is formed within a block defined by the plurality of scanning lines in x-axis and the plurality of scanning lines in y-axis.

5. A micro-electrode matrix, formed on a touch panel with a plurality of scanning lines in first axis and a plurality of scanning lines in second axis, where the touch panel with the plurality of scanning lines in first axis and the plurality of scanning lines in second axis are isolated from each other, comprising:
a plurality of micro-electrode chains in first axis, connected between adjacent ones of the plurality of scanning lines in first axis, each of the micro-electrode chains in first axis comprising:
   a plurality of micro-electrodes in first axis, separated and formed on the first electrode layer; and
   a plurality of series resistances in first axis, connected individually between the plurality of micro-electrodes in first axis and forming the micro-electrode chain in first axis, two of the series resistances in first axis forming two ends of each of the micro-electrode chains in first axis; and
a plurality of micro-electrode chains in second axis, connected between adjacent ones of the plurality of scanning lines in second axis, each of the micro-electrode chain in second axis comprising:
   a plurality of micro-electrodes in second axis, separated and formed on the second electrode layer, wherein the plurality of micro-electrodes in first axis and the plurality of micro-electrodes in second axis correspond to each other in a cross formation; and
   a plurality of series resistances in second axis, connected individually between the plurality of micro-electrodes in second axis and forming the micro-electrode chains in second axis, two of the series resistances in second axis forming two ends of each of the micro-electrode chains in second axis;
a plurality of dummy electrodes, formed on the first electrode layer, corresponding individually to the plurality of micro-electrodes in second axis; and
a plurality of guiding holes, at least one of the plurality of guiding holes being formed on the plurality of micro-electrodes in first axis, used for enhancing the flux of electromagnetic field;
wherein the micro-electrode matrix is formed within a block defined by the plurality of scanning lines in x-axis and the plurality of scanning lines in y-axis.

6. The electrode matrix according to claim 5 wherein an interval between the plurality of micro-electrodes in first axis and the interval between the plurality of micro-electrodes in second axis is between 1 um and 1000 um.

7. A micro-electrode matrix, formed on a touch panel with a plurality of scanning lines in first axis and a plurality of scanning lines in second axis, where the touch panel with the plurality of scanning lines in first axis and the plurality of scanning lines in second axis are isolated from each other, comprising:
- a plurality of micro-electrode chains in first axis, connected between adjacent ones of the plurality of scanning lines in first axis;
- a plurality of micro-electrode chains in second axis, connected between adjacent ones of the plurality of scanning lines in second axis, the plurality of micro-electrodes in first axis and the plurality of micro-electrodes in second axis corresponding to each other; and
- a plurality of guiding holes, at least one of the plurality of guiding holes formed on the plurality of micro-electrodes in first axis, used for enhancing the flux of electromagnetic field;
- wherein the micro-electrode matrix is formed within a block defined by the plurality of scanning lines in x-axis and the plurality of scanning lines in y-axis.

* * * * *